(12) United States Patent
Joachimi et al.

(10) Patent No.: US 7,947,360 B2
(45) Date of Patent: May 24, 2011

(54) POLYAMIDE MOLDING COMPOSITIONS WITH IMPROVED FLOWABILITY

(75) Inventors: Detlev Joachimi, Krefeld (DE); Peter Persigehl, Jiangsu (CN); Kurt Jeschke, Düsseldorf (DE); Marcus Schäfer, Krefeld (DE); Ralph Ulrich, Ratingen (DE); Robert Hubertus Van Mullekom, Lokeren (BE); Jochen Endtner, Köln (DE); Jens Peter Joschek, Köln (DE); Matthias Bienmüller, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 964 days.

(21) Appl. No.: 11/290,749

(22) Filed: Nov. 30, 2005

(65) Prior Publication Data

US 2006/0189747 A1 Aug. 24, 2006

Related U.S. Application Data

(63) Continuation-in-part of application No. PCT/EP2005/006136, filed on Jun. 8, 2004.

(30) Foreign Application Priority Data

Jun. 8, 2004 (DE) .......................... 10 2004 027 872
Feb. 25, 2005 (DE) .......................... 10 2005 009 200

(51) Int. Cl.
*C08L 77/00* (2006.01)
*C08L 77/02* (2006.01)
*C08L 77/06* (2006.01)

(52) U.S. Cl. ........ 428/220; 525/178; 525/179; 525/182; 525/183; 525/184

(58) Field of Classification Search ........... 525/178, 525/179, 182, 183, 184; 428/220
See application file for complete search history.

(56) References Cited

U.S. PATENT DOCUMENTS

| | | | |
|---|---|---|---|
| 3,644,574 A | 2/1972 | Jackson et al. ............... 260/873 |
| 4,013,613 A | 3/1977 | Abolins et al. ............... 260/40 R |
| 4,362,846 A | 12/1982 | Korber et al. ................. 525/66 |
| 4,713,415 A | 12/1987 | Lavengood et al. ........... 525/66 |
| 4,806,593 A | 2/1989 | Kress et al. ................... 525/63 |
| 4,812,515 A | 3/1989 | Kress et al. ................... 525/69 |
| 4,859,740 A | 8/1989 | Damrath et al. .............. 525/100 |
| 4,861,831 A | 8/1989 | Damrath et al. .............. 525/100 |
| 4,937,285 A | 6/1990 | Wittmann et al. .............. 525/67 |
| 5,212,224 A | 5/1993 | Meyer et al. ................... 524/333 |
| 5,352,741 A * | 10/1994 | Dierickx et al. ............... 525/183 |
| 5,482,998 A | 1/1996 | Muehlbach et al. ........... 525/68 |
| 5,493,000 A | 2/1996 | Aharoni ......................... 528/350 |
| 5,756,576 A | 5/1998 | Bruls et al. ..................... 525/66 |
| 5,919,865 A | 7/1999 | Perret et al. ................... 525/183 |
| 6,060,580 A | 5/2000 | Nijenhuis et al. ............. 528/332 |
| 6,361,844 B1 | 3/2002 | Ou-Yang ...................... 482/41.5 |
| 6,376,037 B1 | 4/2002 | Montanari et al. ........... 428/36.9 |
| 6,538,024 B1 | 3/2003 | MacDonald et al. ......... 514/478 |
| 6,713,596 B1 | 3/2004 | Faulhammer et al. ....... 428/36.9 |
| 6,759,480 B1 * | 7/2004 | Bouilloux et al. ............. 525/60 |
| 7,022,768 B1 | 4/2006 | Lacroix et al. |
| 7,151,136 B2 * | 12/2006 | Montanari et al. ............ 525/66 |
| 2006/0189747 A1 | 8/2006 | Joachimi et al. .............. 524/514 |

FOREIGN PATENT DOCUMENTS

| | | |
|---|---|---|
| DE | 4 236 122 | 4/1994 |
| FR | 2 819 821 | 7/2002 |
| JP | A-03-081305 | 4/1991 |
| WO | WO98/08901 | 3/1998 |
| WO | 00/22046 | 4/2000 |
| WO | WO03/064532 | 8/2003 |

OTHER PUBLICATIONS

Kunststoffe 2000, 90 (9), p. 116-118 Carl Hanser Verlag, Munchen; Kleben von Kunststoffen, Eine Ubersicht (with English translation "Bonding of Plastics").
Advances in Polymer Science 1999, 143 (Branched Polymers II), pp. 1-34 Anders Hult et al; "Hyperbranched Polymers" Springer-Verlag Berlin Heidelberg 1999.
Ullman, Enzyklopadie der Technischen Chemie [Encyclopaedia of Industrial Chemistry], vol. 19 (1980), pp. 277-295.

* cited by examiner

*Primary Examiner* — Ana L Woodward
(74) *Attorney, Agent, or Firm* — Nicanor A. Kohncke

(57) ABSTRACT

This invention relates to thermoplastic molding compositions with improved flowabilty based on a thermoplastic polyamide and on a copolymer composed of at least one olefin with at least one methacrylic ester or acrylic ester of an aliphatic alcohol, the MFI of the copolymer being not less than 50 g/10 min, and to a process for preparation of these molding compositions, and also to the use of the these molding compositions, for production of moldings for the electrical, electronics, telecommunications, motor vehicle, or computer industry, in sports, in medicine, in the household or in the entertainment industry.

11 Claims, No Drawings

POLYAMIDE MOLDING COMPOSITIONS WITH IMPROVED FLOWABILITY

CROSS REFERENCE TO RELATED APPLICATION

This application is a continuation-in-part of the International Application No. PCT/EP/2005/006136 claiming priority to DE102004027872.5 filed Jun. 8, 2004 and DE102005009200.4 filed Feb. 25, 2005.

This invention relates to molding compositions based on at least one semicrystalline thermoplastic polyamide and on at least one copolymer composed of at least one olefin, preferably of one α-olefin, with at least one methacrylic ester or acrylic ester of an aliphatic alcohol, the MFI (melt flow index) of the copolymer being not less than 50 g/10 min, and to a process for preparation of these molding compositions, and also to the use of these molding compositions for production of moldings or of semifinished products via injection molding or extrusion.

BACKGROUND OF THE INVENTION

Highly flowable thermoplastic compositions are of interest for a wide variety of injection molding applications. By way of example, thin-walled components in the electrical, electronics and motor vehicle industry require low viscosities from the thermoplastics composition in order to permit material to be charged to the mold with minimum injection pressures and, respectively; clamping forces in the appropriate injection molding machines. This also applies to simultaneous charging of material to two or more injection molding components by way of a shared runner system in what are known as multicavity tooling systems. Shorter cycle times can moreover often be achieved using low-viscosity thermoplastic compositions. Good flowabilities are also specifically very important for highly filled thermoplastic compositions, e.g. with glass fibre and/or mineral contents above 40% by weight.

However, although the thermoplastic compositions have high flowability, the actual components produced therefrom are subjected to stringent mechanical requirements, and the lowering of viscosity cannot therefore be permitted to impair mechanical properties.

There are a number of ways of obtaining highly flowable, low-viscosity thermoplastic molding compositions.

One way uses low-viscosity polymer resins with very low molecular weight as base polymers for the thermoplastic molding compositions. However, the use of low-molecular-weight polymer resins is often associated with sacrifices in mechanical properties, in particular toughness. Preparation of a low-viscosity polymer resin in an existing polymerization plant moreover often requires complicated intervention attended by capital expenditure.

Another way uses what are known as flow aids, also termed flow agents or flow assistants or internal lubricants, which can be added as an additive to the polymer resin.

These flow aids are known from the literature, e.g. in Kunststoffe 2000, 9, p. 116-118, and by way of example can be fatty acid esters of polyols, or amides derived from fatty acids and from amines. However, these fatty acid esters, such as pentaerythritol tetrastearate or ethylene glycol dimontanoate, have only limited miscibility with polar thermoplastics, such as polyamides, polyalkylene terephthalates or polycarbonates. Their concentration increases at the surface of the molding and they are therefore also used as mold-release aids. However, on heat-ageing or else, in the case of polyamides, on absorption of moisture, particularly if concentrations are relatively high, the flow aids can migrate out of these moldings to the surface and become concentrated there. By way of example, in coated moldings this can lead to problems with regard to adhesion to paint or to metal.

As an alternative to the surface-active flow aids, it is possible to use internal flow aids which are compatible with the polymer resins. Examples of those suitable for this purpose are low-molecular-weight compounds or branched, highly branched or dendritic polymers whose polarity is similar to that of the polymer resin. These highly branched or dendritic systems are known from the literature and their basis can by way of example be branched polyesters, polyamides, polyesteramides, polyethers or polyamines, as described in *Kunststoffe* 2001, 91, pp. 179-190, or in *Advances in Polymer Science* 1999, 143 (Branched Polymers II), pp. 1-34.

EP-A 0 682 057 describes the use of the nitrogen-containing first-generation 4-cascade dendrimer: 1,4-diaminobutane [4]propylamine (N,N'-tetrabis(3-aminopropyl)-1,4-butanediamine) DAB(PA)$_4$ to lower viscosity in nylon-6, nylon-6,6 and polybutylene terephthalate (PBT). While use of DAB (PA)$_4$ to lower viscosity in polyamides has practically no effect on the impact resistance of the resultant molding compositions (difference <5%), impact resistance falls by more than 15% in the case of PBT.

WO-A 95/06081 (=U.S. Pat. No. 5,493,000) describes the use of three-dimensional branched polymers having rigid aromatic units in blends with polyamide in order to increase the stiffness of the material and the ultimate tensile strength, with simultaneous reduction in viscosity and in the tensile strain at break of the blends.

EP-A 0 994 157 (=AU 6 233 499 A) describes the use of highly branched polymers which are based on aromatics and which are added during caprolactam polycondensation and are therefore copolymerized. Compositions composed of polyamides in which highly branched polymers have been copolymerized exhibit better mechanical properties and better flowabilities here than comparative compositions without the highly branched components. Addition of the highly branched polymers during the polymerization reaction is described, but no addition to a polymer melt is described.

In principle, improvements in the flowability of polyamides can also be achieved via addition of phenols, of bisphenols, and of similar low-molecular-weight additives. EP-A 0 240 887 (=U.S. Pat. No. 5,212,224) describes molding compositions composed of polyamide, of a rubber and of a bisphenol, these exhibiting improved flowability brought about via the additive.

Alongside improvement in flowability, it is often desirable to improve the toughness of the materials. For this, other copolymers which are based on ethene and on acrylic or methacrylic esters and which bring about an improvement in toughness can also be added to the thermoplastics used.

DE-A 2 758 568 (=U.S. Pat. No. 4,362,846) and DE-A 2 801 585 (=U.S. Pat. No. 4,362,846) describe modification of the toughness of polyamides with acrylate-grafted polyolefins. It is emphasized that the use of the acrylate-modified polyolefins leads to an increase in melt viscosity.

EP-A 1 191 067 (=U.S. Pat. No. 6,759,480) describes modification of the toughness of thermoplastics, inter alia of polyamide and polybutylene terephthalate, via a mixture composed of a copolymer composed of ethene with an unreactive alkyl acrylate, and also of a copolymer composed of ethene with an acrylate having an additional reactive group. There is no discussion of the flowability of the molding compositions.

FR-A 2 819 821 describes the use of copolymers composed of ethene with 2-ethylhexyl acrylate whose MFI (melt flow index) is smaller than 100 as a constituent of hot-melt adhesive mixtures. There are no indications of applications for elastomer modification and/or flowability improvement in semicrystalline thermoplastics.

SUMMARY OF THE INVENTION

The object of the present invention then consisted in lowering the viscosity of polyamide polycondensate compositions by treating the polymer melt with additives, without any resultant need to accept the losses that occur when using low-viscosity linear polymer resins or when using additives disclosed in the literature in properties such as impact resistance and hydrolysis resistance. In terms of stiffness and ultimate tensile strength, the polyamide compositions should if at all possible not differ significantly from the polyamide polycondensate compositions not treated with additives, in order to permit problem-free replacement of the materials for plastic structures based on polyamide.

Achievement of the object and thus the subject matter of the invention is provided by polyamide molding compositions comprising
  A) from 99.9 to 10 parts by weight, preferably from 99.5 to 30 parts by weight, of at least one semicrystalline thermoplastic polyamide and
  B) from 0.1 to 20 parts by weight, preferably from 0.25 to 15 parts by weight, particularly preferably from 1.0 to 10 parts by weight, of at least one copolymer composed of at least one olefin, preferably of one α-olefin, with at least one methacrylic ester or acrylic ester of an aliphatic alcohol, preferably of an aliphatic alcohol having from 1 to 30 carbon atoms, the MFI of the copolymer B) being not less than 50 g/10 min and is preferred in a range of 80 to 900 g/10 min.

For the purposes of the present invention, MFI (melt flow index) has always been measured or determined at 190° C. and with a test load of 2.16 kg.

Surprisingly, it has been found that mixtures composed of at least one semicrystalline thermoplastic polyamide with copolymers of olefins with methacrylic esters or with acrylic esters of aliphatic alcohols, their MFI being not less than 50 g/10 min, lead to the desired lowering of the melt viscosity of the inventive molding compositions prepared therefrom. In comparison with pure thermoplastic polycondensates of identical flowability, the moldings produced from the inventive polyamide molding compositions feature higher impact resistance. The molding compositions have excellent suitability for use in thin-wall technology.

According to the invention, the compositions comprise, as component A), at least one semicrystalline thermoplastic polyamide.

The polyamides to be used according to the invention can be prepared by various processes and can be synthesized from very different units, and, in each specific application, can be used alone or can be treated with processing aids, with stabilizers, with polymeric alloy partners (e.g. elastomers) or else with reinforcing materials (e.g. mineral fillers or glass fibres) to give materials with specifically adjusted combinations of properties. Blends with contents of other polymers, e.g. of polyethylene, polypropylene, ABS (acrylonitrile-butadiene-styrene copolymer) are also suitable, and, if appropriate, one or more compatibilizers can be used. The properties of the polyamides can be improved via addition of elastomers, e.g. with regard to the impact resistance of, for example, reinforced polyamides. The wide variety of possible combinations gives access to a very large number of products with very different properties.

A wide variety of procedures has been disclosed for preparation of polyamides using, as a function of the desired final product, different monomer units, a variety of chain regulators in order to set the desired molecular weight, or else monomers having reactive groups for intended subsequent post-treatments.

The industrially relevant processes for preparation of polyamides mostly proceed by way of polycondensation in the melt. Hydrolytic polymerization of lactams is also polycondensation for this purpose.

According to the invention, polyamides preferably to be used as component A) are semicrystalline polyamides which can be prepared starting from diamines and from dicarboxylic acids and/or from lactams having fewer than 5 ring members or from corresponding amino acids.

Starting materials which can be used are aliphatic and/or aromatic dicarboxylic acids such as adipic acid, 2,2,4- and 2,4,4-trimethyladipic acid, azelaic acid, sebacic acid, isophthalic acid, terephthalic acid; aliphatic and/or aromatic diamines, e.g. tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, e.g. aminocaproic acid, and, respectively the corresponding lactams. Copolyamides composed of two or more of the monomers mentioned are included.

According to the invention, it is particularly preferable to use caprolactams, and very particularly preferable to use ε-caprolactam, or else most of the compounded materials based on PA6, on PA66 and on other aliphatic and/or aromatic polyamides and, respectively, copolyamides, where there are from 3 to 11 methylene groups in these materials for each polyamide group in the polymer chain.

The semicrystalline polyamides to be used according to the invention as component A) can also be used in a mixture with other polyamides and/or with other polymers.

Conventional additives, e.g. mold-release agents, stabilizers and/or flow aids can be admixed with the polyamides in the melt or can be applied to their surface.

The inventive compositions comprise, as component B), copolymers, preferably random copolymers, composed of at least one olefin, preferably an α-olefin, and of at least one methacrylic ester or acrylic ester of an aliphatic alcohol, the MFI of the copolymer B) being not less than 50 g/10 min, preferably not less than 80 g/10 min, and is preferred in a range of 80 to 900 g/10 min. In one preferred embodiment, less than 4% by weight, particularly preferably less than 1.5% by weight and very particularly preferably 0% by weight of the copolymer B) is composed of monomer units which contain further reactive functional groups (selected from the group consisting of epoxides, oxetanes, anhydrides, imides, aziridines, furans, acids, amines, oxazolines).

Suitable olefins, preferably α-olefins as constituent of the copolymers B) preferably have from 2 to 10 carbon atoms and can be unsubstituted or have substitution by one or more aliphatic, cycloaliphatic or aromatic groups.

Preferred olefins have been selected from the group consisting of ethene, propene, 1-butene, 1-pentene, 1-hexene, 1-octene; 3-methyl-1-pentene. Particularly preferred olefins are ethene and propene, and ethene is very particularly preferred.

Mixtures of the olefins described are also suitable.

In another preferred embodiment, the further reactive functional groups (selected from the group consisting of epoxides, oxetanes, anhydrides, imides, aziridines, furans, acids, amines, oxazolines) of the copolymer B) are introduced exclusively by way of the olefins into the copolymer B).

The content of the olefin in the copolymer B) is from 50 to 95% by weight, preferably from 55 to 93% by weight.

The copolymer B) is further defined via the second constituent alongside the olefin. A suitable second constituent is alkyl or arylalkyl esters of acrylic acid or methacrylic acid whose alkyl or arylalkyl group is formed by from 1 to 30 carbon atoms. This alkyl or arylalkyl group can be linear or branched, and can also contain cycloaliphatic or aromatic groups, and alongside this may also have substitution by one or more ether or thioether functions. Other suitable methacrylic or acrylic esters in this connection are those synthesized from an alcohol component which are based on oligoethylene glycol or oligopropylene glycol having only one hydroxy group and at most 30 carbon atoms.

By way of example, the alkyl or arylalkyl group of the methacrylic or acrylic ester can have been selected from the group consisting of methyl, ethyl, i-propyl, n-propyl, n-butyl, i-butyl, s-butyl, t-butyl, 1-pentyl, 1-hexyl, 2-hexyl, 3-hexyl, 1-heptyl, 3-heptyl, 1-octyl, 1-(2-ethyl)hexyl, 1-nonyl, 1-decyl, 1-dodecyl, 1-lauryl or 1-octadecyl. Methyl, butyl and 2-ethylhexyl are preferred. Especially preferred are acrylic acid-n-butyl ester and acrylic acid-2-ethylhexyl ester.

Mixtures of the acrylic or methacrylic esters described are also suitable.

It is preferable here to use more than 60% by weight, particularly preferably more than 90% by weight and very particularly preferably 100% by weight, of 2-ethylhexyl acrylate or n-butyl acrylate, based on the total amount of acrylic and methacrylic ester in copolymer B).

In another preferred embodiment, the further reactive functional groups (selected from the group consisting of epoxides, oxetanes, anhydrides, imides, aziridines, furans, acids, amines, oxazolines) of the copolymer B) are introduced exclusively by way of acrylic or methacrylic esters into the copolymer B).

The content of the acrylic or methacrylic esters in the copolymer B) is from 5 to 50% by weight, preferably from 7 to 45% by weight.

A feature of suitable copolymers B) is not only their constitution but also their low molecular weight. Accordingly, copolymers B) suitable for the inventive molding compositions are only those whose MFI value, measured at 190° C. and with a load of 2.16 kg, is at least 50 g/10 min, preferably being in a range between 80 and 900 g/10 min.

Examples of suitable copolymers as component B) can have been selected from the group of the materials supplied by Atofina with the trade mark Lotryl®, which are usually being used as hot-melt adhesive.

In one preferred embodiment, the inventive polyamide molding compositions can comprise, in addition to components A) and B), one or more of the components of the series C), D), E), F) and G).

In one preferred embodiment of this type, the thermoplastic polyamide molding compositions can therefore also, if appropriate, comprise, in addition to components A) and B),
  C) from 0.001 to 70 parts by weight, preferably from 5 to 50 parts by weight, particularly preferably from 9 to 47 parts by weight, of at least one filler or reinforcing material.

However, the filler or reinforcing material used can also comprise mixtures composed of two or more different fillers and/or reinforcing materials, for example based on talc, mica, silicate, quartz, titanium dioxide, wollastonite, kaolin, amorphous silicas, magnesium carbonate, chalk, feldspar, barium sulfate, glass beads and/or fibrous fillers and/or reinforcing materials based on carbon fibres and/or glass fibres. It is preferable to use mineral particulate fillers based on talc, mica, silicate, quartz, titanium dioxide, wollastonite, kaolin, amorphous silicas, magnesium carbonate, chalk, feldspar, barium sulfate and/or glass fibres. It is particularly preferable to use mineral particulate fillers based on talc, wollastonite, kaolin and/or glass fibres.

Particularly for applications which demand isotropy in dimensional stability and demand high thermal dimensional stability, for example in motor vehicle applications for exterior bodywork parts, it is preferable to use mineral fillers, in particular talc, wollastonite or kaolin.

A further particular preference is also the use of acicular mineral fillers according to the invention, acicular mineral fillers are a mineral filler with highly pronounced acicular character. An example which may be mentioned is acicular wollastonites. The length:diameter ratio of the material is preferably from 2:1 to 35:1, particularly preferably from 3:1 to 19:1, most preferably from 4:1 to 12:1. The average particle size of the inventive acicular minerals is preferably smaller than 20 µm, particularly preferably smaller than 15 µm, with particular preference smaller than 10 µm, determined using a CILAS GRANULOMETER.

As previously described above, the filter and/or reinforcing material may, if appropriate, have been surface-modified, for example using a coupling agent or coupling agent system, e.g. based on silane. However, the pretreatment is not absolutely essential. In particular when glass fibres are used, polymer dispersions, film-formers, branching agents and/or glass fibre processing aids can also be used in addition to silanes.

The glass fibres to be used with particular preference according to the invention whose fibre diameter is generally from 7 to 18 µm, preferably from 9 to 15 µm, are added in the form of continuous-filament fibres or in the form of chopped or ground glass fibres. The fibres can have been equipped with a suitable size system and with a coupling agent or coupling agent system, e.g. based on silane.

Familiar coupling agents based on silane for pretreatment are silane compounds having by way of example the general formula (I)

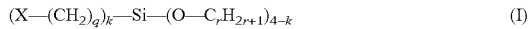

where the substituents are as follows:

X:

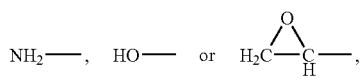

q: a whole number from 2 to 10, preferably from 3 to 4,
r: a whole number from 1 to 5, preferably from 1 to 2, and
k: a whole number from 1 to 3, preferably 1.

Preferred coupling agents are silane compounds from the group of aminopropyltrimethoxysilane, aminobutyltrimethoxysilane, aminopropyltriethoxysilane, aminobutyltriethoxysilane, and also the corresponding silanes which contain a glycidyl group as substituent X.

The amounts generally used of the silane compounds for equipping the fillers are from 0.05 to 2% by weight, preferably from 0.25 to 1.5% by weight and in particular from 0.5 to 1% by weight, based on the mineral filler used for surface coating.

The consequence of processing to give the molding composition or molding is that the d97 or d50 value of the particulate fillers in the molding composition or in the molding can be smaller than that of the fillers initially used. A consequence of the processing to give the molding composition or molding is that the length distributions of the glass fibres in the molding composition or in the molding can be shorter than those of the material initially used.

In one alternative preferred embodiment, the polyamide molding compositions can also, if appropriate, comprise, in addition to components A) and B), and/or C), D) from 0.001 to 65 parts by weight of at least one flame retardant additive.

Flame retardants that can be used in component D) are commercially available organic halogen compounds with synergists or are commercially available organic nitrogen compounds or are organic/inorganic phosphorus compounds individually or in a mixture. It is also possible to use mineral flame retardant additives such as magnesium hydroxide or Ca Mg carbonate hydrates (e.g. DE-A 4 236 122 (=CA 210 9024 A1)). It is also possible to use salts of aliphatic or of aromatic sulphonic acids. Examples which may be mentioned of halogen-containing, in particular brominated and chlorinated compounds are: ethylene-1,2-bistetrabromophthalimide, epoxidized tetrabromobisphenol A resin, tetrabromobisphenol A oligocarbonate, tetrachlorobisphenol A oligocarbonate, pentabromopolyacrylate, brominated polystyrene and decabromodiphenyl ether. Examples of suitable organophosphorus compounds are the phosphorus compounds according to WO-A 98/17720 (=U.S. Pat. No. 6,538,024), e.g. triphenyl phosphate (TPP), resorcinol bis(diphenyl phosphate) (RDP) and the oligomers derived therefrom, and also bisphenol A bis(diphenyl phosphate) (BDP) and the oligomers derived therefrom, and organic and inorganic phosphonic acid derivatives and salts thereof, organic and inorganic phosphonic acid derivatives and salts thereof, in particular metal dialkylphosphinates, e.g. aluminium tris[dialkylphosphinates] or zinc bis[dialkylphosphinates] and moreover red phosphorus, phosphites, hypophosphites, phospine oxides, phosphazenes, melamine pyrophosphate and mixtures of these. Nitrogen compounds which can be used are those from the group of the allantoin derivatives, cyanuric acid derivatives; dicyandiamide derivatives, glycoluril derivatives, guanidine derivatives, ammonium derivatives and melamine derivatives, preferably allantoin, benzoguanamine, glycoluril, melamine, condensates of melamine, e.g. melem, melam or melom and, respectively, higher-condensation-level compounds of this type and adducts of melamine with acids, e.g. with cyanuric acid (melamine cyanurate), phosphoric acid (melamine phosphate) or with condensed phosphoric acids (e.g. melamine polyphosphate). Examples of suitable synergists are antimony compounds, in particular antimony trioxide, sodium antimonate and antimony pentoxide, zinc compounds, e.g. zinc borate, zinc oxide, zinc phosphate and zinc sulphide, tin compounds, e.g. tin stannate and tin borate, and also magnesium compounds, e.g. magnesium oxide, magnesium carbonate and magnesium borate. The materials known as carbonizers can also be added to the flame retardant, examples being phenol-formaldehyde resins, polycarbonates; polyphenyl ethers, polyimides, polysulphones, polyether sulphones, polyphenylene sulphides and polyether ketones, and also antidrip agents, such as tetrafluoroethylene polymers.

In a further alternative preferred embodiment, the polyamide molding compositions can also, if appropriate, comprise, in addition to components A) and B), and/or C) and/or D), E) from 0.001 to 80 parts by weight, particularly preferably from 2 to 25 parts by weight, of at least one elastomer modifier.

The elastomer modifiers to be used as component E) encompass one or more graft polymers of E.1 from 5 to 95% by weight, preferably from 30 to 90% by weight, of at least one vinyl monomer, E.2 from 95 to 5% by weight, preferably from 70 to 10% by weight, of one or more graft bases with glass transition temperatures <10° C., preferably <0° C., particularly preferably <−20° C.

The median particle size ($d_{50}$ value) of the graft base E.2 is generally from 0.05 to 10 μm, preferably from 0.1 to 5 μm, particularly preferably from 0.2 to 1 μm.

Monomers E.1 are preferably mixtures composed of

E.1.1 from 50 to 99% by weight of vinylaromatics and/or ring-substituted vinylaromatics (such as styrene, α-methyl styrene, p-methyl styrene, p-chlorostyrene) and/or ($C_1$-$C_8$)-alkyl methacrylates (e.g. methyl methacrylate, ethyl methacrylate) and E.1.2 from 1 to 50% by weight of vinyl cyanides (unsaturated nitriles, such as acrylonitrile and methacrylonitrile) and/or ($C_1$-$C_8$)-alkyl (meth)acrylates (e.g. methyl methacrylate, n-butyl acrylate, tert-butyl acrylate) and/or derivatives (such as anhydrides and imides) of unsaturated carboxylic acids (e.g. maleic anhydride and N-phenylmaleimide).

Preferred monomers E.1.1 have been selected from at least one of the monomers styrene, α-methylstyrene and methyl methacrylate, and preferred monomers E.1.2 have been selected from at least one of the monomers acrylonitrile, maleic anhydride and methyl methacrylate.

Particularly preferred monomers are E.1.1 styrene and E.1.2 acrylonitrile.

Examples of suitable graft bases E.2 for the graft polymers to be used in the elastomer modifiers E) are diene rubbers, EP(D)M rubbers, i.e. rubbers based on ethylene/propylene and, if appropriate, diene, acrylate rubbers, polyurethane rubbers, silicone rubbers, chloroprene rubbers and ethylene-vinyl acetate rubbers.

Preferred graft bases E.2 are diene rubbers (e.g. based on butadiene, isoprene, etc.) or mixtures of diene rubbers, or are copolymers of diene rubbers or of their mixtures with further copolymerizable monomers (e.g. according to E.1.1 and E.1.2), with the proviso that the glass transition temperature of component E.2 is <10° C., preferably <0° C., particularly preferably <−10° C.

Examples of particularly preferred graft bases E.2 are ABS polymers (emulsion, bulk and suspension ABS), as described by way of example in DE-A 2 035 390 (=U.S. Pat. No. 3,644,574) or in DE-A 2 248 242 (=GB-A 1 409 275) or in Ullmann, Enzyklopädie der Technischen Chemie [Encyclopaedia of Industrial Chemistry], Vol. 19 (1980), pp. 280 et seq. The gel content of the graft base E.2 is preferably at least 30% by weight, particularly preferably at least 40% by Weight (measured in toluene).

The elastomer modifiers or graft polymers E) are prepared via free-radical polymerization, e.g. via emulsion, suspension, solution or bulk polymerization, preferably via emulsion or bulk polymerization.

Other particularly suitable graft rubbers are ABS polymers which are prepared via redox initiation using an initiator system composed of organic hydroperoxide and ascorbic acid according to U.S. Pat. No. 4,937,285.

Because it is known that the graft monomers are not necessarily entirely grafted onto the graft base during the grafting reaction, products which are obtained via (co)polymerization of the graft monomers in the presence of the graft base and are produced concomitantly during the work-up are also graft polymers B according to the invention.

Suitable acrylate rubbers are based on graft bases E.2 which are preferably polymers composed of alkyl acrylates, if appropriate with up to 40% by weight, based on E.2, of other polymerizable, ethylenically unsaturated monomers. Among the preferred polymerizable acrylic esters are $C_1$-$C_8$-alkyl esters, such as methyl, ethyl, butyl, n-octyl and 2-ethylhexyl esters; haloalkyl esters, preferably halo-$C_1$-$C_8$-alkyl esters, such as chloroethyl acrylate, and also mixtures of these monomers.

For crosslinking, monomers having more than one polymerizable double bond can be copolymerized. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinking monomers is preferably from 0.02 to 5% by weight, in particular from 0.05 to 2% by weight, based on the graft base E.2.

In the case of cyclic crosslinking monomers having at least 3 ethylenically unsaturated groups, it is advantageous to restrict the amount to below 1% by weight of the graft base E.2.

Examples of preferred "other" polymerizable, ethylenically unsaturated monomers which can serve alongside the acrylic esters, if appropriate, for preparation of the graft base E.2 are acrylonitrile, styrene, α-methylstyrene, acrylamides, vinyl $C_1$-$C_6$-alkyl ethers, methyl methacrylate, butadiene. Acrylate rubbers preferred as graft base E.2 are emulsion polymers whose gel content is at least 60% by weight.

Further suitable graft bases according to E.2 are silicone rubbers having sites active for grafting purposes, as described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515).

Alongside elastomer modifiers based on graft polymers, it is also possible to use, as component E), elastomer modifiers hot based on graft polymers but having glass transition temperatures <10° C., preferably <0° C., particularly preferably <−20° C. Among these can be, by way of example, elastomers with block copolymer structure. Among these can also be, by way of example, elastomers which can undergo thermoplastic melting. Preferred materials mentioned here by way of example are EPM rubbers, EPDM rubbers and/or SEBS rubbers.

In a further alternative preferred embodiment, the polyamide molding compositions can also, if appropriate, comprise, in addition to components A) and B), and/or C) and/or D) and/or E), F) from 0.001 to 10 parts by weight, preferably from 0.05 to 3 parts by weight, of other conventional additives.

For the purposes of the present invention, examples of conventional additives are stabilizers (e.g. UV stabilizers, heat stabilizers, gamma-ray stabilizers), antistatic agents, flow aids, mold-release agents, further fire-protection additives, emulsifiers, nucleating agents, plasticizers, lubricants, dyes; pigments and additives for increasing electrical conductivity. The additives mentioned and further suitable additives are described by way of example in Gächter, Müller, Kunststoff-Additive [Plastics Additives], 3rd Edition, Hanser-Verlag, Munich, Vienna, 1989 and in Plastics Additives Handbook, 5th Edition, Hanser-Verlag, Munich, 2001; The additives may be used alone or in a mixture, or in the form of masterbatches.

Examples of stabilizers which can be used are sterically hindered phenols, hydroquinones, aromatic secondary amines, e.g. diphenylamines, substituted resorcinols, salicylates, benzotriazoles and benzophenones, and also various substituted representatives of these groups and mixtures thereof.

Examples of pigments and dyes which can be used are titanium dioxide, zinc sulphide, ultramarine blue, iron oxide, carbon black, phthalocyanines, quinacridones, perylenes, nigrosin and anthraquinones.

Examples of nucleating agents which can be used are sodium phenylphosphinate or calcium phenylphosphinate, aluminium oxide, silicon dioxide, and also preferably talc.

Examples of lubricants and mold-release agents which can be used are ester waxes, pentaerythritol tetrastearate (PETS), long-chain fatty acids (e.g. stearic acid or behenic acid) and esters, salts thereof (e.g. Ca stearate or Zn stearate), and also amide derivatives (e.g. ethylenebisstearylamide) or montan waxes (mixtures composed of straight-chain, saturated carboxylic acids having chain lengths of from 28 to 32 carbon atoms), and also low-molecular-weight polyethylene waxes and polypropylene waxes.

Examples of plasticizers which can be used are dioctyl phthalate, dibenzyl phthalate, butyl benzyl phthalate, hydrocarbon oils, N-(n-butyl)benzenesulphonamide.

Additives which can be added to increase electrical conductivity are carbon blacks, conductivity blacks, carbon fibrils, nanoscale graphite fibres and nanoscale carbon fibres, graphite, conductive polymers, metal fibres, and also other conventional additives for increasing electrical conductivity. Nanoscale fibres which can preferably be used are those known as "single-wall carbon nanotubes" or "multiwall carbon nanotubes" (e.g. from Hyperion Catalysis).

In a further alternative preferred embodiment, the polyamide molding compositions can also, if appropriate, comprise, in addition to components A) and B), and/or C) and/or D), and/or E), and/or F), G) from 0.5 to 30 parts by weight, preferably from 1 to 20 parts by weight, particularly preferably from 2 to 10 parts by weight, and most preferably from 3 to 7 parts by weight, of compatibilizer.

Compatibilizers used preferably comprise thermoplastic polymers having polar groups.

According to the invention, polymers used are therefore those which contain

G.1 a vinylaromatic monomer,

G.2 at least one monomer selected from the group of $C_2$-$C_{12}$-alkyl methacrylates, $C_2$-$C_{12}$-alkyl acrylates, methacrylonitriles and acrylonitriles and G.3 dicarboxylic anhydrides containing α,β-unsaturated components.

The component G used preferably comprises terpolymers of the monomers mentioned. Accordingly, it is preferable to use terpolymers of styrene, acrylonitrile and maleic anhydride. In particular, these terpolymers contribute to improvement in mechanical properties, such as tensile strength and tensile strain at break. The amount of maleic anhydride in the terpolymer can vary widely. The amount is preferably from 0.2 to 5 mol %. Amounts of from 0.5 to 1.5 mol % are particularly preferred. In this range, particularly good mechanical properties are achieved in relation to tensile strength and tensile strain at break.

The terpolymer can be prepared in a known manner. One suitable method is to dissolve monomer components of the terpolymer, e.g. styrene, maleic anhydride or acrylonitrile, in a suitable solvent, e.g. methyl ethyl ketone (MEK). One or, if appropriate, more chemical initiators are added to this solution. Examples of suitable initiators are peroxides. The mixture is then polymerized at elevated temperatures for a number of hours. The solvent and the unreacted monomers are then removed in a manner known per se.

The ratio of component G.1 (vinyl aromatic monomer) to component G.2, e.g. the acrylonitrile monomer in the terpolymer is preferably from 80:20 to 50:50.

Styrene is particularly preferred as vinylaromatic monomer G.1.

Acrylonitrile is particularly preferably suitable for component G.2.

Maleic anhydride is particularly preferably suitable as component G.3.

EP-A 0 785 234 (=U.S. Pat. No. 5,756,576) and EP-A 0 202 214 (=U.S. Pat. No. 4,713,415) describe examples of compatibilizers G) which can be used according to the invention. According to the invention, particular preference is given to the polymers mentioned in EP-A 0 785 234.

The compatibilizers can be present in component G) alone or in any desired mixture with one another.

Another substance particularly preferred as compatibilizer is a terpolymer of styrene and acrylonitrile in a ratio of 2.1:1 by weight containing 1 mol % of maleic anhydride. Component G) is used particularly when the molding composition comprises graft polymers, as described under E).

According to the invention, the following combinations of the components are preferred:

```
A, B; A, B, C; A, B, D; A, B, E; A, B, F; A, B, G;
A, B, C, D; A, B, C, E; A, B, C, F; A, B, C, G; A,
B, D, E; A, B, D, F; A, B, D, G; A, B, E, F; A, B,
E, G; A, B, F, G; A, B, C, D, E; A, B, C, D, F; A,
B, C, D, G; A, B, C, E, F; A, B, C, E, G; A, B, C,
F, G; A, B, E, F, G; A, B, D, E, F; A, B, D, E, G;
A, B, D, F, G; A, B, C, D, E, F; A, B, C, D, E, G;
A, B, C, D, F, G; A, B, D, E, F, G; A, B, C, E, F,
G; A, B, C, D, E, F, G.
```

The present invention further provides the preparation of the inventive polyamide molding compositions. This takes place by known processes via mixing of the components in the appropriate proportions by weight. The mixing of the components preferably takes place at temperatures of from 220 to 330° C. by combining, mixing, kneading, extruding or rolling the components together. It can be advantageous to premix individual components. It can moreover be advantageous to produce moldings or semifinished products directly from a physical mixture (dry blend) which has been prepared at room temperature (preferably from 0 to 40° C.) and which is composed of premixed and/or individual components.

The invention further provides the moldings or semifinished products to be produced from the inventive polyamide molding compositions comprising A) from 99.9 to 10 parts by weight, preferably from 99.5 to 30 parts by weight, of at least one semicrystalline thermoplastic polyamide and B) from 0.1 to 20 parts by weight, preferably from 0.25 to 15 parts by weight, particularly preferably from 1.0 to 10 parts by weight, of at least one copolymer composed of at least one olefin, preferably of one α-olefin, with at least one methacrylic ester or acrylic ester of an aliphatic alcohol, preferably of an aliphatic alcohol having from 1 to 30 carbon atoms, the MFI being not less than 50 g/10 min, preferably being in a range between 80 and 900 g/10 min.

A feature of the moldings or semifinished products produced from the polyamide molding compositions used according to the invention is higher impact strength than moldings or semifinished products composed of molding compositions of comparable melt viscosity which have been prepared via use of a relatively low-viscosity base resin as component A). The tensile strain at break of the inventive moldings or semifinished products is often also higher here compared to moldings or semifinished products composed of molding compositions based on a relatively low-viscosity base resin, while the tensile modulus is only very slightly reduced in the inventive moldings, thus permitting replacement of materials.

Further advantages exhibited by the inventive molding compositions in comparison with identical-viscosity molding compositions based on relatively low-viscosity base resins are the following:

lower density;

often more isotropic shrinkage behaviour, leading to less warpage of the moldings;

reduced level of shrinkage, leading to reduced warpage of the moldings;

improved hydrolysis resistance;

improved surface quality of the moldings.

The inventive molding compositions exhibit markedly improved flowability, in particular at shear rates relevant for thermoplastics processing. This is also apparent, inter alia, in markedly reduced injection pressures.

The inventive polyamide molding compositions can be processed by conventional processes, for example via injection molding or extrusion, to give moldings or semifinished products. Examples of semifinished products are foils and sheets. Particular preference is given to processing via injection molding.

The moldings or semifinished products to be produced according to the invention from the polyamide molding compositions can be small or large parts and, by way of example, can be used in the motor vehicle, electrical, electronics, telecommunications, information technology, or computer industry, in the household, in sports, in medicine or in the entertainment industry. In particular, the inventive polyamide molding compositions can be used for applications which require high melt flowability. An example of these applications is what is known as thin-wall technology, in which the wall thicknesses of moldings to be produced from the molding compositions are less than 2.5 mm, preferably less than 2.0 mm, particularly preferably less than 1.5 mm and most preferably less than 1.0 mm. Another example of these applications is cycle time reduction, e.g. via reduction of processing temperature. Another application example is the processing of the molding compositions by way of what are known as multitooling systems, in which material is charged by way of a runner system to at least 4 molds, preferably at least 8 molds, particularly preferably at least 12 molds, most preferably at least 16 molds, in an injection molding procedure.

Moldings composed of the inventive molding compositions can also be used for parts of the cooling circulation system and/or of the oil circulation system of motor vehicles.

EXAMPLES

Component A1: Linear nylon-6 (Durethan® B29, commercially available product from Lanxess Deutschland GmbH, Leverkusen, Germany) with relative solution viscosity 2.9 (measured in m-cresol at 25° C.)

Component A2: Linear nylon-6 (Durethan® B26, commercially available product from Lanxess Deutschland GmbH, Leverkusen, Germany) with relative solution viscosity 2.6 (measured in m-cresol at 25° C.)

Component A3: Linear nylon-6 with relative solution viscosity 2.4 (measured in m-cresol at 25° C.)

Component A4: Linear nylon-66 (Radipol® A45H, commercially available product from Radici, Italy) with relative solution viscosity 3.0 (measured in m-cresol at 25° C.)

Component B1: Copolymer composed of ethene and 2-ethylhexyl acrylate with ethene content of 63% by weight and MFI of 550 (Lotryl® 37 EH 550 from Atofina Deutschland, Dusseldorf; since October 2004 Arkema GmbH)

Component B2: Copolymer composed of ethene and 2-ethylhexyl acrylate with ethene content of 63% by weight and MFI of 175 (Lotryl® 37 EH 175 from Atofina Deutschland, Dusseldorf; since October 2004 Arkema GmbH)

Component B3: Copolymer composed of ethene and acrylic acid-n-butyl ester having an ethene content of 70-74% by weight and MFI of 175 (Lotryl® 28BA175 from Atofina, Deutschland, Dusseldorf; since October 2004 Arkema GmbH, Dusseldorf)

Comparison component V1: Copolymer composed of ethene, methyl acrylate and glycidyl acrylate having 26% by weight content of methyl acrylate and 8% content of glycidyl acrylate, with MFI of 6 (Lotader® AX 8900 from Atofina Deutschland, Dusseldorf; since October 2004 Arkema GmbH)

Component C1: Glassfibre sized with silane-containing compounds and with diameter 11 µm (CS 7928, commercially available product from Lanxess N.V., Antwerp, Belgium)

Component C2: Glassfibre sized with silane-containing compounds and with diameter 10 µm (Vetrotex® P983, commercially available product from Vetrotex-Saint Gobain, Belgium)

Component D1: magnesium hydroxide [CAS No. 1309-42-8]

Component D2: melamine cyanurate [CAS No. 37640-57-6]

Component F:

The following components familiar for use in thermoplastic polyamides were used as further additives:

Nucleating agent: amounts of from 0.01 to 1% by weight of talc [CAS No. 14807-96-6].

Stabilizer: amounts of from 0.01 to 1% by weight of commercially available sterically hindered phenols.

Mold-release agent: amounts of from 0.02 to 2% by weight of N,N'-ethylenebisstearylamide [CAS No. 110-30-5], calcium stearate [CAS No. 1592-23-0].

The nature and amount of each of the further additives (component F) used are the same for the examples and comparisons, F being 0.735%, 2.285%, 0.5% and 1.0%.

Compositions based on PA6 and, respectively, PA66 for the examples in tables 1-3 were compounded in a ZSK32 (Werner and Pfleiderer) twin-screw extruder at melt temperatures of from 260 to 300° C. to give molding compositions, and the melt was discharged into a water bath and then pelletized.

Compositions based on PA6 in table 11 were compounded in a ZSK32 (Werner and Pfleiderer) twin-screw extruder at melt temperatures of from 270 to 285° C. to give molding compositions, and the melt was discharged into a water bath and then pelletized.

The test specimens of the compositions in tables 1-3 and table 11 were injection molded on an Arburg 320-210-500 injection molding machine at melt temperatures of about 270° C. (tables 1 and 3) or 280° C. (table 2 and 11) and at a mold temperature of about 80° C. to give dumbell specimens (thickness 3 mm to ISO 527), 80×10×4 mm$^3$ test specimens (to ISO 178), plaques 60×60×2 mm$^3$, standard test specimens for the UL 94 V test (thickness 0.75 mm) and test specimens for the glow-wire test to DIN EN 60695-2-13 (thickness 1.5 and 3.0 mm);

The injection pressure is a processing parameter that was determined during injection molding of dumbbell test specimens. The injection pressure is the cavity pressure, measured near the gate, and applied to fill the mold cavity. In the pressure curve, it is a characteristic kink between the mold filling and packing phase, that can be determined via process data acquisition.

Except for the melt viscosity measurements and for the determination of flow spiral length, all of the tests listed in the tables below were carried out on the abovementioned test specimens:

Tensile test to determine tensile modulus and tensile stress at break to DIN EN ISO 527-2/1A Tensile strain at break: extensibility determined to DIN EN ISO 527-2/1A.

Flexural test to determine flexural stress, flexural modulus, flexural strength and outer fibre strain to DIN EN ISO 178

Impact strength: IZOD method to ISO 180/1U at room temperature and at −30° C.

UL 94 V combustibility: to UL 94

GWIT: determination of glow-wire ignition temperature to DIN EN 60695-2-13

Melt viscosity: determined to DIN 54811/ISO 11443 at the stated shear rate and temperature, using Viscorobo 94.00 equipment from Göttfert after drying of the pellets at 80° C. for 48 hours in a vacuum dryer.

Shrinkage: To determine shrinkage properties, standardized sheets of dimension 60 mm×60 mm×2 mm (ISO 294-4) are injection molded. Longitudinal and transverse shrinkage is determined both in terms of molding shrinkage and in terms of after-shrinkage, via subsequent measurement.

Molding shrinkage and after-shrinkage together give the total shrinkage.

The flow spiral length was tested on compounds from examples and comparison examples on a flow spiral (3 mm thickness) at a mass temperature of 280° C. and a tool temperature of 80° C. The flow spiral length was measured in cm and is the flow path in the flow spiral.

The density was determined by the buoyancy of a test specimen by DIN EN ISO 1183-1.

The surface appraisal and visual surface assessement was determined visually on test specimens of dimension 60 mm×60 mm×2 mm. Decisive criteria for judgement were gloss, smoothness, colour and uniform surface structure.

TABLE 1

Reinforced PA6 molding compositions

|  |  | Comp. 1 | Ex. 1 | Ex. 2 | Comp. 2 | Ex. 3 | Comp. 3 |
|---|---|---|---|---|---|---|---|
| Component A1 | [%] | 69.265 | 63.265 | 63.265 | — | — | — |
| Component A2 | [%] | — | — | — | 69.265 | 63.265 | — |
| Component A3 | [%] | — | — | — | — | — | 69.265 |
| Component B1 | [%] | — | — | 6 | — | 6 | — |
| Component B2 | [%] | — | 6 | — | — | — | — |
| Component C1 | [%] | 30 | 30 | 30 | 30 | 30 | 30 |
| Component F | [%] | 0.735 | 0.735 | 0.735 | 0.735 | 0.735 | 0.735 |
| Melt viscosity (270° C., 1500 s$^{-1}$) | [Pas] | 175 | 103 | 91 | 112 | 67 | 91 |
| Izod impact strength (ISO 180 1U, RT) | [kJ/m$^2$] | 61 | 71 | 70 | 50 | 67 | 49 |
| Tensile modulus | [MPa] | 9190 | 8989 | 8673 | 9220 | 8730 | 9130 |
| Tensile stress at break | [MPa] | 167 | 158 | 150 | 171 | 155 | 173 |

TABLE 2

Reinforced PA66 molding compositions

|  |  | Comp. 4 | Ex. 4 | Comp. 5 |
|---|---|---|---|---|
| Component A4 | [%] | 67.715 | 67.715 | 67.715 |
| Component B1 | [%] | — | 6 | — |
| Comparison component V1 | [%] | — | — | 6 |
| Component C2 | [%] | 30 | 30 | 30 |
| Component F | [%] | 2.285 | 2.285 | 2.285 |
| Melt viscosity (270° C., 1500 s$^{-1}$) | [Pas] | 207 | 109 | 290 |
| Melt viscosity (290° C., 1500 s$^{-1}$) | [Pas] | 144 | 86 | 218 |
| Izod impact strength (ISO 180 1U, RT) | [kJ/m$^2$] | 72 | 74 | 80 |
| Tensile modulus | [MPa] | 9250 | 8820 | 9090 |
| Tensile stress at break | [%] | 183 | 166 | 166 |
| Flexural modulus | [MPa] | 8575 | 7794 | 7578 |
| Flexural strength | [MPa] | 279 | 249 | 245 |
| Flexural modulus after storage in coolant[1] | [MPa] | 3327 | 3254 | 2648 |
| Flexural strength after storage in coolant[1] | [MPa] | 45 | 48 | 26 |
| Izod impact strength (ISO 180 1U, RT) after storage in coolant[1] | [kJ/m$^2$] | 23 | 25 | 14 |

[1] 1008 h of storage in ethylene glycol-water mixture (1:1) at 130° C./2 bar. Test (flexural test, flexural impact test) at room temperature.

TABLE 3

Flame-retardant molding compositions

|  |  | Comp. 6 | Ex. 5 | Comp. 7 | Ex. 6 |
|---|---|---|---|---|---|
| Component A1 | [%] | 16.4 | 16.4 | 9 | 9 |
| Component A3 | [%] | 16.6 | 16.6 | — | — |
| Component A2 | [%] | — | — | 82.5 | 79.5 |
| Component B1 | [%] | — | 3 | — | 3 |
| Component C1 | [%] | 14 | 14 | — | — |
| Component D1 | [%] | 52 | 52 | — | — |
| Component D2 | [%] | — | — | 8 | 8 |
| Component F | [%] | 1.0 | 1.0 | 0.5 | 0.5 |
| Melt viscosity (280° C., 1000$^{-1}$) | [Pas] | 467 | 308 | — | — |
| Melt viscosity (280° C., 1500$^{-1}$) | [Pas] | 371 | 272 | — | — |
| Melt viscosity (300° C., 1500$^{-1}$) | [Pas] | 228 | 201 | — | — |
| Izod impact strength (ISO 180 1U, RT) | [kJ/m$^2$] | — | — | 85 | 130 |
| Flexural modulus | [MPa] | 12700 | 11500 | 3300 | 3000 |
| Outer fibre strain | [%] | 2.1 | 1.8 | 6.0 | 6.0 |
| UL 94 V (0.75 mm) | Class | V2 | V0 | V2 | V2 |
| GWIT (1.5 mm) | [° C.] | >775 | >775 | — | — |
| GWIT (3.0 mm) | [° C.] | — | — | 750 | 775 |

Further examples are:

TABLE 4

Examples of inventive compounded PA6 materials; data in % by weight; the compounding materials may also comprise amounts of at most 10% (in each case present in the PA component) of additives such as processing aids (e.g. mold-release agents, stabilizers, nucleating agents, colorants, etc.).

| | | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|
| Component A1 (incl. additives) | [%] | 64 | — | 64 | — | 64 | 64 | 64 | 92 | 88 | 55 |
| Component A3 (incl. additives) | [%] | — | 62 | — | 64 | — | — | — | — | — | — |
| Glass fibres (chopped strands) | [%] | 20 | 20 | 20 | 20 | — | — | — | — | — | — |
| Glass fibres (long glass fibres) | [%] | — | — | — | — | — | — | — | — | — | 40 |
| Glass microbeads (Potters Ballotini 3000 CP 03) | [%] | 10 | 10 | — | — | — | — | — | — | — | — |
| Kaolin | [%] | — | — | 10 | 10 | 30 | — | — | — | — | — |
| Talc | [%] | — | — | — | — | — | 30 | — | — | — | — |
| Wollastonite | [%] | — | — | — | — | — | — | 30 | — | — | — |
| Montmorillonite[1] nanophyllosilicate | [%] | — | — | — | — | — | — | — | 2 | — | — |
| Montmorillonite[2] nanophyllosilicate | [%] | — | — | — | — | — | — | — | — | 6 | — |
| Conductivity black | [%] | — | — | — | — | — | — | — | — | — | — |
| Carbon fibre | [%] | — | — | — | — | — | — | — | — | — | — |
| Graphite | [%] | — | — | — | — | — | — | — | — | — | — |
| Paraloid EXL 3300 acrylate rubber | [%] | — | 2 | — | — | — | — | — | — | — | — |
| Exxelor VA1801 EPM rubber | [%] | — | — | — | — | — | — | — | — | — | — |
| Component B1 | [%] | 6 | 6 | 6 | 6 | 6 | 6 | 6 | 6 | 6 | 5 |

| | | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|
| Component A1 (incl. additives) | [%] | — | — | 64 | — | 59 | 49 | 64 | — | — |
| Component A3 (incl. additives) | [%] | 32 | 54 | — | 62 | — | — | — | 62 | 62 |
| Glass fibres (chopped strands) | [%] | — | 40 | 22 | — | 30 | 30 | — | — | — |
| Glass fibres (long glass fibres) | [%] | 65 | — | — | 22 | — | — | — | — | — |
| Glass microbeads (Potters Ballotini 3000 CP 03) | [%] | — | — | — | — | — | — | — | — | — |
| Kaolin | [%] | — | — | — | — | — | — | — | — | — |
| Talc | [%] | — | — | — | — | — | — | — | — | — |
| Wollastonite | [%] | — | — | — | — | — | — | — | 30 | 30 |
| Montmorillonite[1] nanophyllosilicate | [%] | — | — | — | — | — | — | — | — | — |
| Montmorillonite[2] nanophyllosilicate | [%] | — | — | — | — | — | — | — | — | — |
| Conductivity black | [%] | — | — | — | — | 5 | — | — | — | — |
| Carbon fibre | [%] | — | — | 8 | 8 | — | — | — | — | — |
| Graphite | [%] | — | — | — | — | — | 15 | 30 | — | — |
| Paraloid EXL 3300 acrylate rubber | [%] | — | 2 | — | 2 | — | — | — | 2 | — |
| Exxelor VA1801 EPM rubber | [%] | — | — | — | — | — | — | — | — | 2 |
| Component B1 | [%] | 3 | 4 | 6 | 6 | 6 | 6 | 6 | 6 | 6 |

[1] via polymerization
[2] via compounding

TABLE 5

Examples of inventive compounded PA66 materials; data in % by weight; the compounding materials may also comprise amounts of at most 10% (in each case present in the PA component) of additives such as processing aids (e.g. mold-release agents, stabilizers, nucleating agents, colorants, etc.).

|  |  | Ex. 26 | Ex. 27 | Ex. 28 | Ex. 29 | Ex. 30 | Ex. 31 | Ex. 32 | Ex. 33 | Ex. 34 | Ex. 35 |
|---|---|---|---|---|---|---|---|---|---|---|---|
| Component A4 (incl. additives) | [%] | 64 | 62 | 64 | 64 | 64 | 64 | 64 | 92 | 88 | 55 |
| Glass fibres (chopped strands) | [%] | 20 | 20 | 20 | 20 | — | — | — | — | — | — |
| Glass fibres (long glass fibres) | [%] | — | — | — | — | — | — | — | — | — | 40 |
| Glass microbeads (Potters Ballotini 3000 CP 03) | [%] | 10 | 10 | — | — | — | — | — | — | — | — |
| Kaolin | [%] | — | — | 10 | 10 | 30 | — | — | — | — | — |
| Talc | [%] | — | — | — | — | — | 30 | — | — | — | — |
| Wollastonite | [%] | — | — | — | — | — | — | 30 | — | — | — |
| Montmorillonite[1] nanophyllosilicate | [%] | — | — | — | — | — | — | — | 2 | — | — |
| Montmorillonite[2] nanophyllosilicate | [%] | — | — | — | — | — | — | — | — | 6 | — |
| Conductivity black | [%] | — | — | — | — | — | — | — | — | — | — |
| Carbon fibre | [%] | — | — | — | — | — | — | — | — | — | — |
| Graphite | [%] | — | — | — | — | — | — | — | — | — | — |
| Paraloid EXL 3300 acrylate rubber | [%] | — | 2 | — | — | — | — | — | — | — | — |
| Exxelor VA1801 EPM rubber | [%] | — | — | — | — | — | — | — | — | — | — |
| Component B1 | [%] | 6 | 6 | 6 | 6 | 6 | 6 | 6 | 6 | 6 | 5 |

|  |  | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|---|
| Component A4 (incl. additives) | [%] | 32 | 54 | 64 | 62 | 59 | 49 | 64 | 62 | 62 |
| Glass fibres (chopped strands) | [%] | — | 40 | 22 | — | 30 | 30 | — | — | — |
| Glass fibres (long glass fibres) | [%] | 65 | — | — | 22 | — | — | — | — | — |
| Glass microbeads (Potters Ballotini 3000 CP 03) | [%] | — | — | — | — | — | — | — | — | — |
| Kaolin | [%] | — | — | — | — | — | — | — | — | — |
| Talc | [%] | — | — | — | — | — | — | — | — | — |
| Wollastonite | [%] | — | — | — | — | — | — | — | 30 | 30 |
| Montmorillonite[1] nanophyllosilicate | [%] | — | — | — | — | — | — | — | — | — |
| Montmorillonite[2] nanophyllosilicate | [%] | — | — | — | — | — | — | — | — | — |
| Conductivity black | [%] | — | — | — | — | 5 | — | — | — | — |
| Carbon fibre | [%] | — | — | 8 | 8 | — | — | — | — | — |
| Graphite | [%] | — | — | — | — | — | 15 | 30 | — | — |
| Paraloid EXL 3300 acrylate rubber | [%] | — | 2 | — | 2 | — | — | — | 2 | — |
| Exxelor VA1801 EPM rubber | [%] | — | — | — | — | — | — | — | — | 2 |
| Component B1 | [%] | 3 | 4 | 6 | 6 | 6 | 6 | 6 | 6 | 6 |

[1] via polymerization
[2] via compounding

TABLE 6

Examples of inventive compounded copolyamide materials; data in % by weight; the compounding materials may also comprise amounts of at most 10% (in each case present in the PA component) of additives such as processing aids (e.g. mold-release agents, stabilizers, nucleating agents, colorants, etc.).

|  |  | Ex. 45 | Ex. 46 | Ex. 47 | Ex. 48 | Ex. 49 | Ex. 50 | Ex. 51 | Ex. 52 | Ex. 53 | Ex. 54 |
|---|---|---|---|---|---|---|---|---|---|---|---|
| CPA 66/5 copolyamide (PA6 having 5% of PA66) (incl. additives) | [%] | 64 | 62 | 64 | 64 | 64 | 64 | 64 | 92 | 88 | 55 |
| Glass fibres (chopped strands) | [%] | 20 | 20 | 20 | 20 | — | — | — | — | — | — |
| Glass fibres (long glass fibres) | [%] | — | — | — | — | — | — | — | — | — | 40 |
| Glass microbeads (Potters Ballotini 3000 CP 03) | [%] | 10 | 10 | — | — | — | — | — | — | — | — |
| Kaolin | [%] | — | — | 10 | 10 | 30 | — | — | — | — | — |
| Talc | [%] | — | — | — | — | — | 30 | — | — | — | — |
| Wollastonite | [%] | — | — | — | — | — | — | 30 | — | — | — |
| Montmorillonite[1] nanophyllosilicate | [%] | — | — | — | — | — | — | — | 2 | — | — |
| Montmorillonite[2] nanophyllosilicate | [%] | — | — | — | — | — | — | — | — | 6 | — |
| Conductivity black | [%] | — | — | — | — | — | — | — | — | — | — |
| Carbon fibre | [%] | — | — | — | — | — | — | — | — | — | — |
| Graphite | [%] | — | — | — | — | — | — | — | — | — | — |
| Paraloid EXL 3300 acrylate rubber | [%] | — | 2 | — | — | — | — | — | — | — | — |
| Exxelor VA1801 EPM rubber | [%] | — | — | — | — | — | — | — | — | — | — |
| Component B1 | [%] | 6 | 6 | 6 | 6 | 6 | 6 | 6 | 6 | 6 | 5 |

|  |  | Ex. 55 | Ex. 56 | Ex. 57 | Ex. 58 | Ex. 59 | Ex. 60 | Ex. 61 | Ex. 62 | Ex. 63 |
|---|---|---|---|---|---|---|---|---|---|---|
| CPA 66/5 copolyamide (PA6 having 5% of PA66) (incl. additives) | [%] | 32 | 54 | 64 | 62 | 59 | 49 | 64 | 62 | 62 |
| Glass fibres (chopped strands) | [%] | — | 40 | 22 | — | 30 | 30 | — | — | — |
| Glass fibres (long glass fibres) | [%] | 65 | — | — | 22 | — | — | — | — | — |
| Glass microbeads (Potters Ballotini 3000 CP 03) | [%] | — | — | — | — | — | — | — | — | — |
| Kaolin | [%] | — | — | — | — | — | — | — | — | — |
| Talc | [%] | — | — | — | — | — | — | — | — | — |
| Wollastonite | [%] | — | — | — | — | — | — | — | 30 | 30 |
| Montmorillonite[1] nanophyllosilicate | [%] | — | — | — | — | — | — | — | — | — |
| Montmorillonite[2] nanophyllosilicate | [%] | — | — | — | — | — | — | — | — | — |
| Conductivity black | [%] | — | — | — | — | 5 | — | — | — | — |
| Carbon fibre | [%] | — | — | 8 | 8 | — | — | — | — | — |
| Graphite | [%] | — | — | — | — | — | 15 | 30 | — | — |
| Paraloid EXL 3300 acrylate rubber | [%] | — | 2 | — | 2 | — | — | — | 2 | — |
| Exxelor VA1801 EPM rubber | [%] | — | — | — | — | — | — | — | — | 2 |
| Component B1 | [%] | 3 | 4 | 6 | 6 | 6 | 6 | 6 | 6 | 6 |

[1] via polymerization
[2] via compounding

TABLE 7

Examples of inventive compounded PA materials; data in % by weight; the compounding materials may also comprise amounts of at most 10% (in each case present in the PA component) of additives such as processing aids (e.g. mold-release agents, stabilizers, nucleating agents, colorants, etc.).

| | | Ex. 64 | Ex. 65 | Ex. 66 | Ex. 67 | Ex. 68 | Ex. 69 | Ex. 70 | Ex. 71 | Ex. 72 | Ex. 73 | Ex. 74 | Ex. 75 | Ex. 76 | Ex. 77 |
|---|---|---|---|---|---|---|---|---|---|---|---|---|---|---|---|
| Component A1 (incl. additives) | [%] | 47 | 47 | 45 | 45 | 45 | 43 | 75 | 75 | 73 | 74 | 74 | 72 | 40 | — |
| Component A4 | [%] | — | — | — | — | — | — | — | — | — | — | — | — | — | 40 |
| Component C1 | [%] | 30 | 30 | 30 | 30 | 30 | 30 | — | — | — | — | — | — | 30 | 30 |
| Milled Fibre | [%] | — | — | — | — | — | — | — | — | — | — | — | — | — | — |
| Kaolin | [%] | — | — | — | — | — | — | — | — | — | — | — | — | — | — |
| Talc | [%] | — | — | — | — | — | — | — | — | — | — | — | — | — | — |
| Wollastonite | [%] | — | — | — | — | — | — | — | — | — | — | — | — | — | — |
| Mica | [%] | — | — | — | — | — | — | — | — | — | — | — | — | — | — |
| Component D2 | [%] | — | 6 | — | — | 6 | — | — | 6 | — | — | 6 | — | — | — |
| Aluminium tris(diethylphosphinate) | [%] | 12 | 12 | 20 | — | — | — | 14 | 14 | 22 | — | — | — | — | — |
| Zinc bis[diethylphosphinate] | [%] | — | — | — | 14 | 14 | 22 | — | — | — | 15 | 15 | 23 | — | — |
| Melamine polyphosphate | [%] | 6 | — | — | 6 | — | — | 6 | — | — | 6 | — | — | 25 | 25 |
| Component B1 | [%] | 5 | 5 | 5 | 5 | 5 | 5 | 5 | 5 | 5 | 5 | 5 | 5 | 5 | 5 |

TABLE 8

Examples of inventive compounded PA materials; data in % by weight; the compounding materials may also comprise amounts of at most 10% (in each case present in the PA component) of additives such as processing aids (e.g. mold-release agents, stabilizers, nucleating agents, colorants, etc.).

| | | Ex. 78 | Ex. 79 | Ex. 80 | Ex. 81 | Ex. 82 | Ex. 83 | Ex. 84 | Ex. 85 | Ex. 86 | Ex. 87 | Ex. 88 | Ex. 89 | Ex. 90 |
|---|---|---|---|---|---|---|---|---|---|---|---|---|---|---|
| Component A1 (incl. additives) | [%] | — | — | 54 | 54 | 54 | 54 | 54 | — | — | — | — | — | 74 |
| Component A4 | [%] | 51 | 51 | — | — | — | — | — | 54 | 54 | 54 | 54 | 54 | — |
| Component C1 | [%] | 25 | 25 | — | — | — | — | — | — | — | — | — | — | — |
| Milled Fibre | [%] | — | — | 30 | — | — | — | — | 30 | — | — | — | — | — |
| Kaolin | [%] | — | — | — | 30 | — | — | — | — | 30 | — | — | — | — |
| Talc | [%] | — | — | — | — | 30 | — | — | — | — | 30 | — | — | — |
| Wollastonite | [%] | — | — | — | — | — | 30 | — | — | — | — | 30 | — | — |
| Mica | [%] | — | — | — | — | — | — | 30 | — | — | — | — | 30 | — |
| Component D2 | [%] | — | 6 | 11 | 11 | 11 | 11 | 11 | 11 | 11 | 11 | 11 | 11 | 11 |
| Aluminium tris-(diethylphosphinate) | [%] | 13 | 13 | — | — | — | — | — | — | — | — | — | — | — |
| Zinc bis-[diethylphosphinate] | [%] | — | — | — | — | — | — | — | — | — | — | — | — | — |
| Melamine polyphosphate | [%] | 6 | — | — | — | — | — | — | — | — | — | — | — | — |
| Rubber | [%] | — | — | — | — | — | — | — | — | — | — | — | — | 10 |
| Component B1 | [%] | 5 | 5 | 5 | 5 | 5 | 5 | 5 | 5 | 5 | 5 | 5 | 5 | 5 |

TABLE 9

Examples of inventive compounded PA materials; data in % by weight; the compounding materials may also comprise amounts of at most 10% (in each case present in the PA component) of additives such as processing aids (e.g. mold-release agents, stabilizers, nucleating agents, colorants, etc.).

| | | Ex. 91 | Ex. 92 | Ex. 93 | Ex. 94 | Ex. 95 | Ex. 96 | Ex. 97 | Ex. 98 | Ex. 99 | Ex. 100 | Ex. 101 | Ex. 102 | Ex. 103 |
|---|---|---|---|---|---|---|---|---|---|---|---|---|---|---|
| Component A1 (incl. additives) | [%] | 37.7 | 35.7 | 42.7 | 43.7 | 32.7 | 32.7 | — | 42.7 | 57.7 | — | — | — | — |
| Component A4 | [%] | — | — | — | — | — | — | 37.7 | — | — | 59 | 53 | 52 | 57 |
| Component C1 | [%] | 30 | 30 | 30 | 30 | 30 | 30 | 30 | 15 | — | 30 | 30 | 30 | 30 |
| Polybromostyrene | [%] | 22 | — | — | — | 22 | 22 | 22 | 22 | 22 | — | — | — | — |
| Polydibromostyrene | [%] | — | 24 | — | — | — | — | — | — | — | — | — | — | — |
| Decabromodiphenylethane | [%] | — | — | 17 | — | — | — | — | — | — | — | — | — | — |
| Decabromodiphenyl ether | [%] | — | — | — | 16 | — | — | — | — | — | — | — | — | — |
| Zinc borate | [%] | — | — | — | — | 5 | — | — | — | — | — | — | 1 | — |
| Zinc sulphide | [%] | — | — | — | — | — | 5 | — | — | — | — | — | — | — |
| Antimony trioxide | [%] | 5 | 5 | 5 | 5 | 5 | 5 | 5 | 5 | 5 | — | — | — | — |

TABLE 9-continued

Examples of inventive compounded PA materials; data in % by weight; the compounding materials may also comprise amounts of at most 10% (in each case present in the PA component) of additives such as processing aids (e.g. mold-release agents, stabilizers, nucleating agents, colorants, etc.).

|  |  | Ex. 91 | Ex. 92 | Ex. 93 | Ex. 94 | Ex. 95 | Ex. 96 | Ex. 97 | Ex. 98 | Ex. 99 | Ex. 100 | Ex. 101 | Ex. 102 | Ex. 103 |
|---|---|---|---|---|---|---|---|---|---|---|---|---|---|---|
| (80% masterbatch in PA 6) Teflon | [%] | 0.3 | 0.3 | 0.3 | 0.3 | 0.3 | 0.3 | 0.3 | 0.3 | 0.3 | — | — | — | — |
| Red phosphorus | [%] | — | — | — | — | — | — | — | — | — | 6 | 6 | 6 | 8 |
| Rubber | [%] | — | — | — | — | — | — | — | 10 | 10 | — | 6 | 6 | — |
| Component B1 | [%] | 5 | 5 | 5 | 5 | 5 | 5 | 5 | 5 | 5 | 5 | 5 | 5 | 5 |

TABLE 10

Examples of inventive compounded PA materials; data in % by weight; the compounding materials may also comprise amounts of at most 10% (in each case present in the PA component) of additives such as processing aids (e.g. mold-release agents, stabilizers, nucleating agents, colorants, etc.).

|  |  | Ex. 104 | Ex. 105 | Ex. 106 | Ex. 107 | Ex. 108 | Ex. 109 | Ex. 110 | Ex. 111 | Ex. 112 |
|---|---|---|---|---|---|---|---|---|---|---|
| Component A1 (incl. additives) | [%] | 51 | 37.7 | 37.7 | 37.7 | 37.7 | 37.7 | 37.7 | 37.7 | 37.7 |
| Component A4 | [%] | — | — | — | — | — | — | — | — | — |
| Component C1 | [%] | 30 | — | — | — | — | 15 | 15 | 15 | 15 |
| Milled Fibre | [%] | — | — | — | — | — | — | — | — | — |
| Kaolin | [%] | — | 30 | — | — | — | 15 | — | — | — |
| Talc | [%] | — | — | 30 | — | — | — | 15 | — | — |
| Wollastonite | [%] | — | — | — | 30 | — | — | — | 15 | — |
| Mica | [%] | — | — | — | — | 30 | — | — | — | 15 |
| Polybromostyrene | [%] | — | 22 | 22 | 22 | 22 | 22 | 22 | 22 | 22 |
| Polydibromostyrene | [%] | — | — | — | — | — | — | — | — | — |
| Antimony trioxide | [%] | — | 5 | 5 | 5 | 5 | 5 | 5 | 5 | 5 |
| (80% masterbatch in PA 6) Teflon | [%] | — | 0.3 | 0.3 | 0.3 | 0.3 | 0.3 | 0.3 | 0.3 | 0.3 |
| Red phosphorus | [%] | 8 | — | — | — | — | — | — | — | — |
| Rubber | [%] | 6 | — | — | — | — | — | — | — | — |
| Component B1 | [%] | 5 | 5 | 5 | 5 | 5 | 5 | 5 | 5 | 5 |

TABLE 11

|  |  | Comparison 8 | Example 113 |
|---|---|---|---|
| A1 | [%] | 69.82 | 64.82 |
| C1 | [%] | 30.0 | 30.0 |
| B3 | [%] | — | 5.0 |
| microtalc | [%] | 0.02 | 0.02 |
| ester wax | [%] | 0.16 | 0.16 |
| Injection pressure | [bar] | 312 | 235 |
| Melt viscosity (260° C., 1000 s$^{-1}$) | [Pas] | 219 | 133 |
| Melt viscosity (260° C., 1500 s$^{-1}$) | [Pas] | 176 | 102 |
| Melt viscosity (280° C., 1000 s$^{-1}$) | [Pas] | 162 | 100 |
| Melt viscosity (280° C., 1500 s$^{-1}$) | [Pas] | 135 | 80 |
| Melt viscosity (300° C., 1000 s$^{-1}$) | [Pas] | 112 | 81 |
| Melt viscosity (300° C., 1500 s$^{-1}$) | [Pas] | 97 | 66 |
| Flow spiral length | [cm] | 44 | 52 |
| Izod-impact strength (ISO 180/1U, RT) | [kJ/m$^2$] | 78 | 71 |
| Izod-impact strength (ISO 180/1U, −30° C.) | [kJ/m$^2$] | 64 | 69 |
| Total shrinkage (4 h/120° C.) longitudinal | [%] | 0.32 | 0.31 |
| transverse | | 0.76 | 0.75 |
| Bending test: | | | |
| Flexural stress | [MPa] | 242 | 221 |
| Outer fiber strain | [%] | 4.6 | 4.4 |
| Flexural strength | [MPa] | 264 | 236 |
| Flexural modulus | [MPa] | 8200 | 7510 |
| Tensile experiment: | | | |
| Breaking stress | [MPa] | 172 | 154 |
| Elongation at break | [%] | 3.9 | 3.7 |
| Tensile modulus | [MPa] | 9270 | 8720 |
| Density | [g/cm$^3$] | 1.36 | 1.33 |
| Surface quality | | gut | sehr gut |

RT = room temperature

What is claimed is:

1. A molding composition comprising:
   A) from 99.9 to 10 parts by weight of at least one semicrystalline thermoplastic polyamide, said semicrystalline thermoplastic polyamide being obtained by polycondensation polymerization and/or hydrolytic polymerization; and
   B) from 0.1 to 20 parts by weight of at least one poly(ethylene-co-2-ethylhexyl acrylate) copolymer having a Melt Flow Index (MFI) of about 550 g/10 min which is formed via the polymerization of polymerizable monomers comprising a mixture of ethylene and 2-ethylhexyl acrylate, and wherein said parts by weight are based on the total weight of the molding composition.

2. The molding composition according to claim 1, wherein said monomers of copolymer B) contain further reactive functional groups selected from the group consisting of epoxides, oxetanes, anhydrides, imides, aziridines, furans, acids, amines, and oxazolines and wherein said further reactive functional groups are present in an amount of less than 4% by weight of the copolymer B).

3. The molding composition according to claim 1, wherein in addition to A) and B), one or more components are added from the following series of components:

C) from 0.001 to 70 parts by weight of at least one filler or reinforcing material, D) from 0.001 to 65 parts by weight of at least one flame retardant additive, and F) from 0.001 to 10 parts by weight of other conventional additives.

4. A process for the preparation of the polyamide molding composition according to claim 1, comprising the steps of:

mixing together the appropriate proportions by weight of the components A) and B) as set forth in claim 1.

5. A process of producing a molding or a semifinished product comprising the steps of forming via injection molding the molding composition according to claim 1 into said molding or semifinished product.

6. The method according claim 5, wherein the molding or semifished product is used for parts of the cooling circulation system of motor vehicles.

7. The method according to claim 5, wherein the molding or semifished product is used for parts of the oil circulation system of motor vehicles.

8. A method of producing compositions in a multi-tooling comprising charging the molding composition according to claim 1 to at least four molds by way of a runner system in an injection molding procedure.

9. A process of producing a molding or a semifinished product comprising the steps of extruding the molding composition according to claim 1.

10. A method of preparing thin-walled moldings, comprising the steps of molding the molding composition according to claim 1.

11. The method according to claim 10, wherein the wall thickness of said molding is less than 2.5 mm.

* * * * *